United States Patent [19]

Andrews

[11] 4,199,391
[45] Apr. 22, 1980

[54] METHOD OF USING A LAMINATING CARRIER

[75] Inventor: Paul A. Andrews, Belmont, Mass.

[73] Assignee: Polaroid Corporation, Cambridge, Mass.

[21] Appl. No.: 936,125

[22] Filed: Aug. 23, 1978

Related U.S. Application Data

[63] Continuation of Ser. No. 471,570, May 20, 1974, abandoned, which is a continuation-in-part of Ser. No. 295,202, Oct. 5, 1972, abandoned.

[51] Int. Cl.² .......................... C09J 5/00; B30B 15/34
[52] U.S. Cl. .............................. 156/324.4; 156/583.1; 156/228; 156/292; 156/323
[58] Field of Search .............. 156/580, 583, 306, 309; 249/121; 425/501, DIG. 48

[56] References Cited

U.S. PATENT DOCUMENTS

| 2,458,349 | 1/1949 | Cross | 40/154 |
| 3,047,051 | 7/1962 | Matveeff | 156/583 |
| 3,208,899 | 9/1965 | Bicher | 156/539 |
| 3,598,684 | 8/1971 | Milhana | 156/583 |
| 3,614,839 | 10/1971 | Thomas | 156/334 |
| 3,679,514 | 7/1972 | Kuhns | 156/309 |

Primary Examiner—Douglas J. Drummond
Attorney, Agent, or Firm—Louis G. Xiarhos

[57] ABSTRACT

A novel article for accommodating a heat sealable laminar assembly while heat is applied thereto.

8 Claims, 6 Drawing Figures

METHOD OF USING A LAMINATING CARRIER

CROSS-REFERENCE TO RELATED PATENT APPLICATIONS

This application is a continuation of my copending application, Ser. No. 471,570, filed May 20, 1974 now abandoned, for LAMINATING CARRIER, which in turn is a continuation-in-part of now-abandoned application Ser. No. 295,202, filed Oct. 5, 1972 now abandoned.

BACKGROUND OF THE INVENTION

1. The Field of the Invention

This invention relates to heat sealed laminar products such as I.D. cards, I.D. credit cards or the like and particularly to an article and process employing same useful in the assembly of such products.

2. Description of the Prior Art

Heat sealed laminar products such as I.D. cards, I.D. credit cards or the like are known products or commerce and their desired performance characteristics are well defined. In addition to being compact they must be durable, resistant to wear and to the effects of moisture, sunlight and other conditions. The fabrication of such products ideally should be simple and rapid, with a minimum of manipulative steps which can be accomplished in a routine day to day fashion without the requirement of specialized techniques and knowledge. At the same time, the steps should be such that they can consistently assure that the products obtained uniformly possess the ultimate quality and performance characteristics desired.

In the fabrication of heat sealed laminar products of the type mentioned, the laminar assembly usually has as essential elements thereof, an information bearing card, a transparent plastomeric sheet material as a front member, a plastomeric back sheet member and a heat activatable adhesive system integrated with the elements of the assembly so that sealing can be effected by the application of suitable heat and pressure to the assembly. Usually heated rollers or platen presses are employed in the heat sealing operation and more often than not the assembly is placed in a carrier before heat is applied thereto.

The primary function of the carrier is to protect the elements of the assembly, e.g., the information-bearing element and the plastomeric members from adverse effects that could result if heat were directly applied to the assembly. Carriers heretofore employed essentially comprise two thin sheets coupled together usually along one edge thereof so that the laminar assembly can be quickly and easily inserted therebetween. The sheets can be fabricated of durable, heat resistant plastics or papers but most commonly are fabricated of aluminum which in thin sheets provide the desired degree of durability and optimum heat transmission characteristics.

An outstanding problem in the use of carriers of the type heretofore employed involves extrusion of the heat activatable adhesive system from the laminar assembly as the assembly and carrier are heated. This extrusion is particularly encountered when the carrier and assembly are passed between heated rollers and in most instances, the major portion of the extrudate manifests itself especially at the trailing edge of the heated assembly, e.g., that portion of the assembly which passes through the rollers last. The presence of the extrudate is not only aesthetically displeasing but oftentimes it must be removed especially if the overall dimensions of the laminar product are critical. The existence of this problem diminishes the assurance of the assembler that laminar products of uniform predetermined dimensions will be consistently produced thereby sometimes requiring individual inspection of each product as well as additional finishing operations such as trimming or the like to remove the extrudate.

One method of controlling excess extrudate in the heat lamination operation is disclosed in U.S. Pat. No. 3,679,514 issued July 25, 1972 to Roger J. Kuhn. Said patent discloses a process for eliminating die cutting and trimming of finished laminated plastic I.D. cards. Essentially, the disclosed process involves providing top and bottom protective plastic sheets having the exact dimensions of the finally produced cards and employing "sparse" amounts of adhesive for laminating a data card between the protective top and bottom sheets. The adhesive employed in the preferred embodiment of the disclosed process comprises a medium density polyethylene with or without a heat reactive phenolic. Apparently the maximum thickness of a layer of the combined adhesives is 0.0025 inch on each protective sheet or a maximum thickness of 0.005 inch for both sheets.

In many instances, the use of such a "sparse" amount of adhesive does not provide the desired bonding characteristics between the protective plastic sheets and the data card. Instead, thicker layers of adhesive are essential and adhesive layers conventionally employed in the art oftentimes are in the order of 0.005 inch or greater on each sheet. With layers of such thickness, extrusion of the heat activatable adhesive system can occur and accordingly trimming operations and like problems are not completely eliminated or avoided.

Extrusion of heat activatable adhesive about the edges of the final I.D. or I.D. credit card is an especially important consideration when the card is designed to provide a hole punching capability such as Hollerith hole punching capability. In such I.D. or I.D. credit cards, the edge of the card is employed as a reference for both installing as well as interpreting or reading the capability. Accordingly, minimal tolerance is assigned the edge dimension and in the past such tolerance were obtained by post die cutting of the final laminated card. However, the problem of obtaining such tolerances becomes extremely complicated when a pre-cut laminar assembly is involved providing the potential for extrusion of adhesive on lamination.

The present invention provides a novel carrier and method for using same which is designed to avoid the above-discussed extrusion problem. Accordingly, the carrier and method of employing same can be used in the fabrication of laminar products to provide improved efficiency of operation and assure the production of uniform laminar products which consistently conform to the predesired quality and dimensions.

SUMMARY OF THE INVENTION

Essential elements of the carrier of the present invention comprise top and bottom sheet members coupled along one edge and providing an elevation or border positioned on one of the sheets parallel to the coupled edge so that the laminar assembly can be positioned in the carrier between the coupled edge and the elevation or border with the elevation or border abutting or closely bearing against the edge of the laminar assembly adjacent thereto.

In employing the carrier of the present invention in a heat lamination operation, a laminar assembly comprising an information-bearing element inserted between heat sealable plastomeric sheets at least one of which is transparent is inserted into the carrier so that the laminar assembly is at least closely accommodated between the coupled edges of the carrier and the edge of the elevation. Sufficient heat and pressure are then applied to the carrier and laminar assembly to obtain the final laminated product.

DESCRIPTION OF THE PREFERRED EMBODIMENTS

The preferred heat laminated products produced in accordance with the present invention include I.D. cards and I.D. credit cards having a color print which is completely enclosed by two plastomeric sheet sealed together along their periphery and having the surface of the print securely laminated to the inner surface of at least one, but preferably both plastomeric sheets.

A particularly useful photographic procedure for forming the color print is described and claimed in the aforementioned U.S. Pat. No. 2,983,606. In such a procedure, a photosensitive element including at least one light-sensitive silver halide emulsion and associated layer of dye developer (dye which is also a silver halide developing agent) is exposed to provide a developable image; the thus exposed element is contacted with an aqueous alkaline processing composition to develop the image and as a function thereof to form an imagewise distribution of mobile and diffusible dye; and this imagewise distribution is then transferred, at least in part, by imbibition, to a superposed image-receiving element comprising a dyeable stratum to impart thereto a positive dye transfer image of the original subject matter.

The image-receiving element used in these processes generally comprises an opaque or transparent support coated with an image-receiving layer of a dyeable material which is permeable to the alkaline processing composition. The dyeable material may comprise polyvinyl alcohol together with a polyvinyl pyridine polymer such as a poly-4-vinyl pyridine polymer. Such image-receiving elements are further described in U.S. Pat. No. 3,148,061 issued to Howard C. Haas.

Figure 1:
FIG. 1 is an I.D. card representative of the type conventionally employed in providing heat laminated I.D. cards or I.D. credit cards.

A typical I.D. card of the preferred embodiments of the present invention is shown in FIG. 1 wherein it will be seen that the print 10 comprises an image-containing layer 12 on a suitable support 14 of paper or the like. In layer 12 a photographic likeness of the individual appears at one portion of the print and the desired descriptive matter is contained at another portion. The descriptive indicia may be supplied by any desired means, e.g., typing, but is preferably a part of the photograph.

A preferred system for preparing print 10 utilizes the aforementioned color diffusion transfer procedures. A data card containing the desired descriptive information is inserted into the camera so that both the subject and the descriptive matter pertaining to him are simultaneously photographed to provide a single developable image which is thereafter processed in the aforementioned manner to provide print 10. This may be accomplished most expeditiously with the camera of the Polaroid ID-2 or ID-3 Land Identification System.

Figure 2:
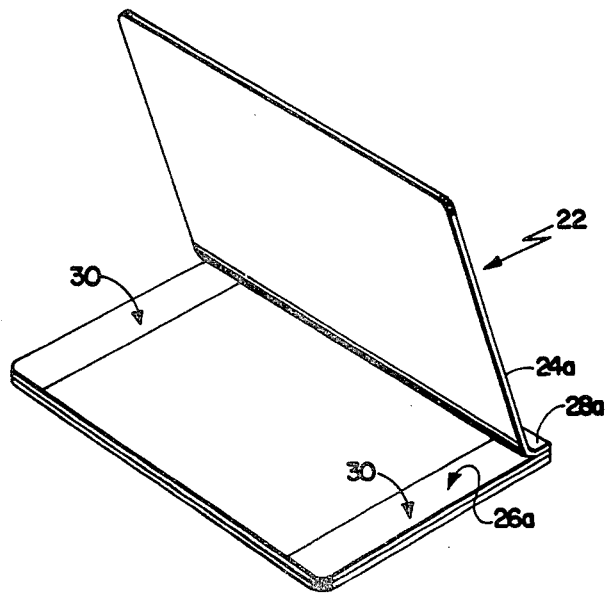
FIG. 2 is a perspective view of a preferred pre-cut protective overlay blank of plastomeric sheets employed in providing heat laminated I.D. cards or I.D. credit cards.

FIG. 2 illustrates a protective overlay blank generally designated as 22 which is especially preferred in the practice of the present invention. As shown therein, overlay blank 22 comprises a front wall member 24a and a rear wall member 26a sealed or coupled together along one edge 28a. The inner surface of front wall member 24a and the inner surface of rear wall member 26a are provided with a heat activatable adhesive.

As examples of suitable heat activatable adhesives of ethylene acrylic acid copolymers or ethylene-ethyl acrylate copolymers contemplated for use, mention may be made of ethylene-acrylic acid and ethylene-ethyl acrylate copolymers wherein the percent acrylic acid or ethylene-ethyl acrylate in the respective copolymers is preferably from about 5 to about 20 percent. The melt index of contemplated ethylene-acrylic acid or ethylene-ethyl acrylate copolymers as measured in accordance with the procedure ASTMD 1238 can preferably range between about 5 to about 300. As mentioned, mixtures of the above copolymers can be employed and the ratio of either of the copolymers to the other can vary over a rather wide range; for example, between 1:10 or lower to 10:1 or higher. The copolymer and/or mixture thereof is normally extruded in the form of a layer or film on the surface of the polyester sheet material and usually a urethane or polyester adhesive is employed to bond the layer or film to the surface of the polyester sheet material.

Products having the above described copolymers in the form of a layer or film bonded to the surface of a polyester sheet material are commercially available. For example, a product designated as Laminating Film 14A and supplied by General Binding Corporation comprises a layer of an ethylene-ethyl acrylate copolymer bonded to the surface of a polyester sheet. Also a product designated as Dow Overlaminating Film PZ 5557.08 and supplied by Dow Chemical Company comprises a layer of an ethylene-acrylic acid copolymer bonded to the surface of a polyester sheet.

An especially preferred blank of the present invention comprises a layer of the above-mentioned heat activatable adhesives coated on surfaces 24a and 26a and an overcoat of a layer of a hydroxylated polymer on the adhesive layer of surface 24a. Preferred hydroxylated polymers include polyvinyl alcohol and copolymers thereof as well as mixtures of polyvinyl alcohol with polyvinyl pyridines especially poly-4-vinyl pyridine. Details relating to blanks of this type are described in copending, commonly assigned U.S. patent application Ser. No. 148,768 filed by Michael E. Gordon on June 1, 1971. In such blanks, the adhesive coating on each surface 24a and 26a is about 0.006 inch thick.

Figure 3:
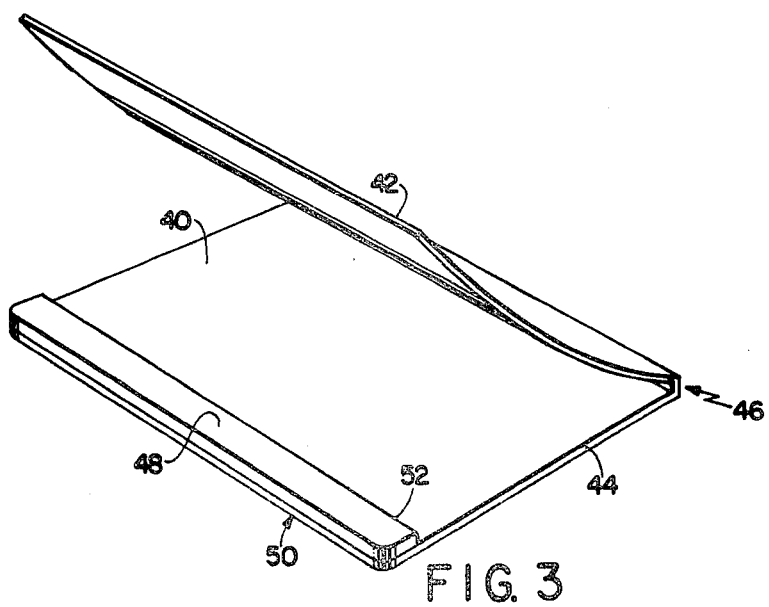
FIG. 3 is a perspective view of a carrier of the present invention.

A laminated I.D. card and/or I.D. credit card may be prepared by pressing the surface of the I.D. card 10 against the inner surface of front wall member 24a, and then bringing the respective wall members in superposition and heat sealing such as in a platen press or roll laminator. The wall members are preferably somewhat larger in dimensions than the print, so that a peripheral area of the superposed wall members free from contact with the print may be bonded together by the adhesive coating to perfect a tight seal. Also in the preferred blanks, registry means are provided so that the I.D. card can be quickly and conveniently placed in the proper position between wall members 24a and 26a. For example, as shown in FIG. 3, scribe marks 30, 5 mils wide and 3 mils deep are provided on the surface of 26a and together with the edge of the heat seal along 28a aid in aligning the I.D. card in the desired position between members 24a and 26a. Scribe marks of the type described above fuse upon heating of the laminate and are virtually invisible in the final laminar assembly.

As mentioned, the heat lamination or sealing of I.D. cards or I.D. credit cards in such apparatus as platen presses or rollers usually involve the use of a carrier to protect the elements of the laminar assembly from adverse effects that could result if heat were directly applied thereto. However, in the lamination of assemblies of the type involving adhesive layers having a combined thickness greater than about 0.005 inch or higher, extrusion of the adhesive can occur because of the heat and pressure involved. Moreover, this extrusion is obtained with or without the use of carriers employed in the art before and its effect is especially noticeable if the combined thickness of the adhesive involved is 0.010 inch or greater. For example, when the above-mentioned preferred overlay blank having an adhesive layer of 0.006 inch on each surface 24a and 26a is employed in the lamination operation extrusion of the adhesive can and does occur and the use of carriers known to the art does not diminish the amount of extrudate obtained.

Figure 5:
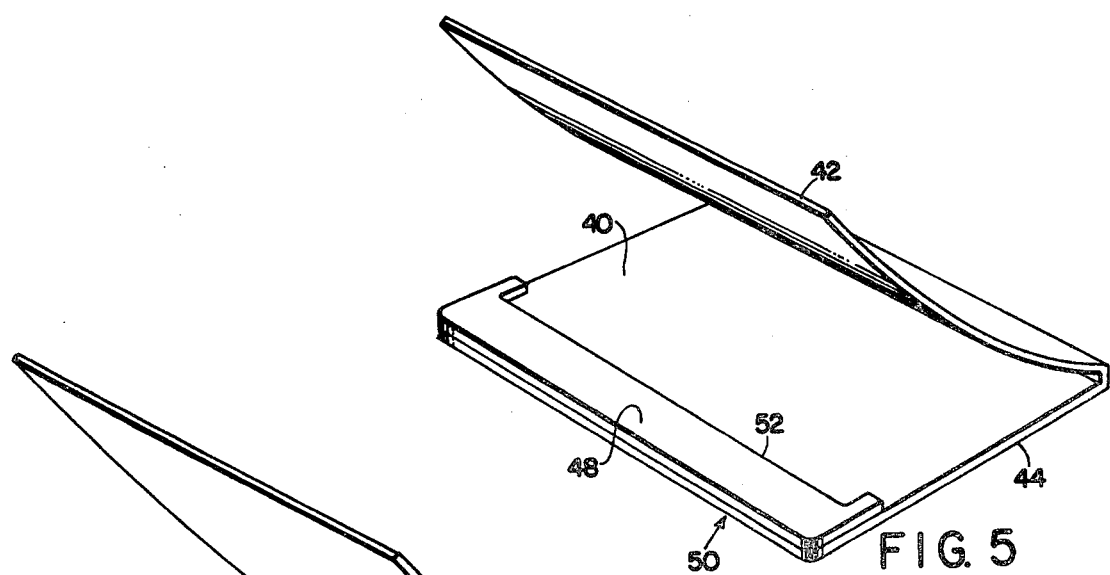
FIGS. 5 and 6 are perspective views of other carriers of the present invention wherein the carrier of FIG. 5 is a modification of the carrier of FIG. 3 while the carrier of FIG. 6 provides a continuous elevation or border which closely accommodates laminar assembly elements inserted thereinto.

In accordance with the practice of the present invention, it has been found that a carrier of distinctive configuration can provide high quality heat laminated products without the attendant extrudate problem normally encountered in operations heretofore employed. As shown in FIGS. 3 and 5, a carrier of the present invention generally designated as 40 essentially comprises two thin sheets 42 and 44 coupled along the leading edge thereof 46. The dimensions of the sheets 42 and 44 are somewhat larger than the dimensions of the laminar assembly to be inserted therebetween and the coupling at edge 46 can be affected in known manners such as by adhesives or preferably by folding in the manner shown so that the height of edge 46 is approximately equivalent to the overall thickness of the laminar assembly to be inserted therebetween thereby providing a first edge 46 against which one side of the assembly is butted. Sheets 42 and 44 may be fabricated of such materials as plastics, papers or metals. Preferably, however, carrier 40 is fabricated of a thin sheet of aluminum, plastic, paper or carboard folded as shown to provide sheets 42 and 44. The thickness of the aluminum, plastic, paper or cardboard can vary between for example, between about 2 mils and 10 mils. However suitable results may be obtained with a carrier fabricated of heavy craft paper about 8 mils thick.

In accordance with the practice of the present invention, an elevation or border 48 is fixedly positioned at trailing edge 50 of sheet 44. As shown, elevation or border 48 is approximately equal in length to the length of trailing edge 50. The length itself is not especially critical providing a second edge 52 is provided which is at least substantially equivalent to the dimension of the side of the laminar assembly butted against second edge 52. The height of the elevation 48 especially along edge 52 thereof is also not considered critical but in order to assure uniform adhesion between all elements of the assembly, the thickness of edge 52 the height preferably should not exceed the combined thickness of the elements of the laminar assembly inserted between sheets 42 and 44. Actually in the preferred embodiment, the thickness of edge 52 is slightly less for example, in the order of 5 to 10 percent less than the combined thickness of the elements of the laminar assembly inserted between sheet members 42 and 44. The minimum thickness of edge 52 should be no less than that required to retain any of the adhesive system from being extruded between that side of the top and bottom members of the laminar assembly inserted into carrier 40 and which is butted against edge 52.

Figure 4:
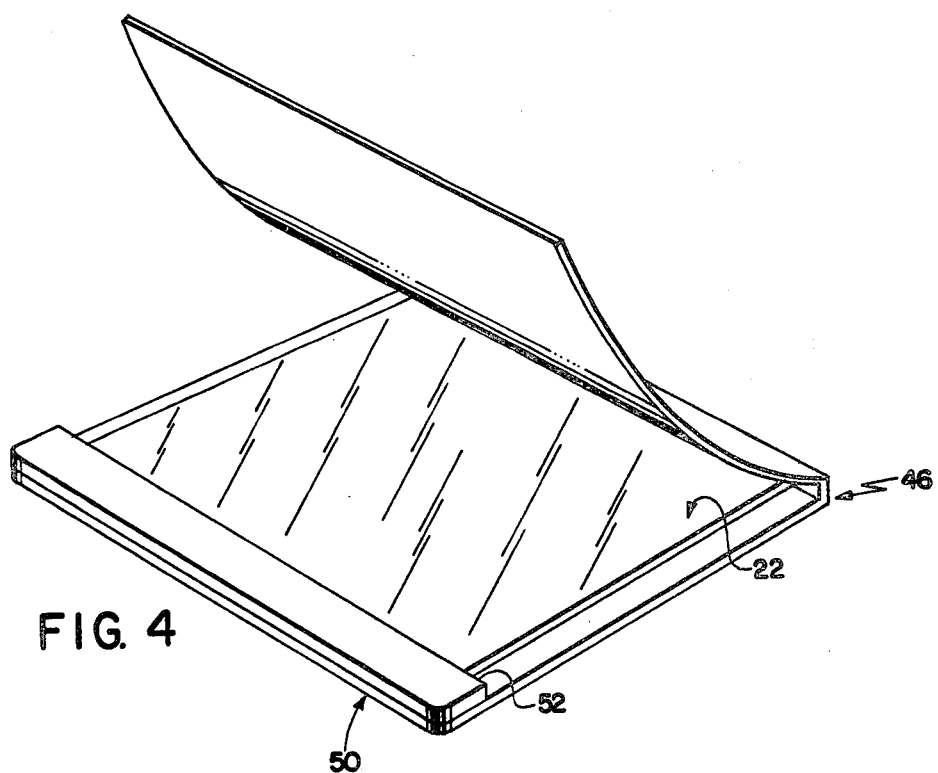
FIG. 4 is a perspective view of a carrier of the present invention accommodating a laminar assembly comprising elements of the type shown in FIGS. 1 and 2.

FIG. 4 illustrates the carrier 40 and a laminar assembly 22 inserted between sheets 42 and 44. As mentioned, laminar assembly 22 comprises overlay blank 22 and I.D. card 10 inserted between protective sheets 24a and 26a. Laminar assembly 22 is inserted between carrier sheets 42 and 44 so that edge 28a of laminar assembly 22 abuts against edge 46 of carrier 40 while the trailing edge of laminar assembly 22 abuts edge 52 of border 48. Accordingly, laminar assembly 22 is accommodated between first edge 46 and second edge 52 of carrier 40.

In lamination operations involving the carrier of the present invention, sheet 42 is superposed on laminar assembly 22 and carrier 40 and assembly 22 are processed through a heat laminating device of the type conventionally employed in the art such as heated rollers or known platen presses. The conditions of heat and pressure involved in laminating devices of the type conventionally employed are known to the art. However, under such conditions—whether a platen press or heated roller is involved—the heat activatable adhesive is subject to flow and migration and as mentioned, extrudate is produced especially when coatings of adhesive on each sheet in excess of 0.003 or 0.004 inch are involved. However, by employing the carrier of the present invention the flow or migration of the adhesive system is apparently restrained or limited and excess extrudate is not obtained regardless whether a heated roller or platen is employed to effect heat lamination of the assembly.

Figure 6:
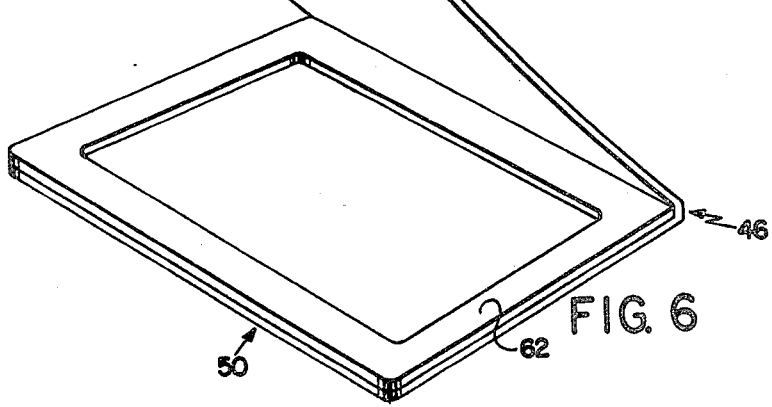

As mentioned in the previous description, essential elements of the carrier of the present invention comprise coupled sheet members providing an elevation or border so that at least two parallel edges or sides of laminar assemblies inserted therein are closely accommodated between the coupled edge and the elevation or border. FIG. 5 illustrates a modified carrier of FIGS. 3 and 4 while FIG. 6 illustrates a modified carrier wherein the elevation provides a continuous frame or border— so that all edges or sides of the laminar assembly are accommodated by frame 62. The carrier of FIG. 6 provides especially efficient control over the potential extrudate problem. Additionally, the carrier of FIG. 6 provides special advantages in that the carrier is especially adaptable for use with a wider range of laminar assemblies. For example, in carriers of the type shown in FIGS. 3 and 4, the preferred laminar assembly involves an overlay blank having wall members coupled together as shown in FIG. 2. Such coupled overlay blanks provide special conveniences in combination with the carriers of the present invention since the operation involves only appropriate positioning of the data card between wall members 24a and 26a and insertion of the laminar assembly between the carrier sheet members. However, in the case of a carrier of FIG. 6 laminar assemblies comprising non-coupled blanks can also be efficiently employed. In other words, the carrier of FIG. 6 is also particularly adaptable to assembly operations involving separate wall members such as 24a and 26a of FIG. 2. In such operations, the rear wall member, e.g., 26a is inserted into frame 62 and a data card appropriately positioned the surface thereof bearing the heat activatable adhesive. A front wall member is, e.g., (24a) is then inserted into the space defined by frame 62 and superposed on the data card and rear wall member. The entire laminar assembly is accordingly confined within and accommodated by frame 62. The carrier is then closed and the assembly is laminated under suitable conditions of heat and/or pressure.

Many modifications of incidental details in the above description offered for the purposes of illustrating a preferred embodiment of the invention may be made without departing from the spirit and scope of the invention defined in the appended claims.

What is claimed is:

1. A process comprising the steps of inserting a laminar assembly, prior to application of heat thereto, between the front and back members of a carrier, said laminar assembly comprising an information-bearing card interposed between a transparent sheet as a front member and a plastomeric sheet as a back member and a heat activatable adhesive system which comprises at least one layer of a heat activatable adhesive integrated with at least one of said front and back members, said carrier having lengthwise and widthwise dimensions exceeding those of said assembly and comprising front and back members coupled along one edge thereof, a first edge located near or at said coupled edge against which a side of said laminar assembly can be butted, an elevation positioned on at least one of said members parallel to said first edge, said elevation providing a second edge positioned apart from said first edge so that the side of said laminar assembly parallel to the side thereof butted against said first edge can be butted against said second edge so that the laminar assembly can be closely accommodated between said first and second edges, said second edge having a minimum thickness no less than that required to retain any of said adhesive system from being extruded between that side of said front and back members butted against said second edge; applying sufficient heat and pressure to said carrier and assembly to effect heat lamination of said assembly; and removing the resulting heat-laminated assembly from said carrier.

2. The process of claim 1 wherein said heat activatable adhesive system comprises at least one layer of adhesive having a thickness of 0.004 inch or greater.

3. The process of claim 1 wherein said heat activatable system comprises a layer of adhesive applied to said front and back members and at least one of said layers has a thickness of 0.004 inch or greater.

4. The process of claim 1 wherein said first edge and said elevation of said carrier are defined by a continuous frame and said laminar assembly is inserted in said frame so that the parallel sides of the assembly can be butted against the edges of the frame.

5. The process of claim 1 wherein said front and back members of said carrier are coupled together by a fold which also provides said first edge.

6. The process of claim 1 wherein said front and back members of said carrier are thin metallic sheets.

7. The process of claim 1 wherein said front and back members are thin paper sheets.

8. The process of claim 1 where the thickness of said second edge of said carrier does not exceed the overall thickness of the members of the assembly.

* * * * *